(12) United States Patent
Maeda (10) Patent No.: US 7,044,839 B2
(45) Date of Patent: May 16, 2006

(54) GLASS SUBSTRATE FOR INFORMATION RECORDING MEDIUM AND PROCESS FOR MANUFACTURING THE SAME

(75) Inventor: Makoto Maeda, Osaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/142,795

(22) Filed: May 31, 2005

(65) Prior Publication Data

US 2005/0287933 A1    Dec. 29, 2005

Related U.S. Application Data

(63) Continuation of application No. PCT/JP04/00839, filed on Jan. 29, 2004.

(30) Foreign Application Priority Data

Jan. 31, 2003 (JP) .............................. 2003-025077

(51) Int. Cl.
    *B24B 1/00*      (2006.01)

(52) U.S. Cl. .................... 451/41; 451/63; 451/59; 216/97; 65/31; 65/88

(58) Field of Classification Search ................ 451/36, 451/41, 59, 53, 61, 63; 252/79.5, 279.1; 65/31, 88, 97; 216/100, 103, 104, 108, 109
See application file for complete search history.

(56) References Cited

U.S. PATENT DOCUMENTS

| | | | | |
|---|---|---|---|---|
| 3,685,218 A | * | 8/1972 | Gambale et al. ............... | 451/41 |
| 4,833,001 A | * | 5/1989 | Kijima et al. ................ | 428/141 |
| 5,580,667 A | * | 12/1996 | Lal et al. ..................... | 428/610 |
| 5,645,471 A | * | 7/1997 | Strecker ....................... | 451/59 |
| 5,725,625 A | * | 3/1998 | Kitayama et al. ........... | 65/30.14 |
| 5,833,871 A | * | 11/1998 | Matsushita et al. ........... | 216/22 |
| 5,899,794 A | * | 5/1999 | Shige et al. .................. | 451/41 |
| 6,383,404 B1 | | 5/2002 | Sakai et al. | |
| 6,491,572 B1 | | 12/2002 | Horie et al. | |
| 6,553,788 B1 | | 4/2003 | Ikeda et al. | |
| 2002/0061603 A1 | | 5/2002 | Nobuyuki | |

FOREIGN PATENT DOCUMENTS

| | | |
|---|---|---|
| JP | 05-282664 | 10/1993 |
| JP | 2000-132829 | 5/2000 |
| JP | 2000-251253 | 9/2000 |

(Continued)

*Primary Examiner*—Lee D. Wilson
*Assistant Examiner*—Anthony Ojini
(74) *Attorney, Agent, or Firm*—Sheridan Ross P.C.

(57) ABSTRACT

A glass substrate for use in an information recording medium is manufactured by polishing a surface of a disc-shaped glass substrate and then performing texture processing on the surface. The texture processing includes the steps of forming lines of texture on the surface of the glass substrate extending along a circumferential direction of the glass substrate by performing a mechanical texture formation method in which the surface of the glass substrate is supplied with an abrasive slurry while an abrasive member slidably contacts the surface, and correcting the shape of the texture by removing burrs formed on the texture during the formation of the texture. The correction of the shape of the texture is performed by using a correcting pad made of foam of a synthetic resin having a 100% modulus of 3 to 40 MPa and scrubbing the surface of the glass substrate with the correcting pad in a direction intersecting the direction in which the texture extends.

22 Claims, 7 Drawing Sheets

FOREIGN PATENT DOCUMENTS

| | | |
|---|---|---|
| JP | 2000-348338 | 12/2000 |
| JP | 2001-341058 | 12/2001 |
| JP | 2002-117532 | 4/2002 |
| JP | 2002-352422 | 12/2002 |

* cited by examiner

GLASS SUBSTRATE FOR INFORMATION RECORDING MEDIUM AND PROCESS FOR MANUFACTURING THE SAME

CROSS-REFERENCE TO RELATED APPLICATION

This application is a continuation application which claims priority to PCT/JP2004/000839, filed Jan. 29, 2004, under 35 U.S.C. § 365(c).

BACKGROUND OF THE INVENTION

The present invention relates to a glass substrate that is useful in an information recording medium, such as a magnetic disc, a magnetic optical disc, and an optical disc, for an information recording device, such as a hard disc drive, and a process for manufacturing the same. More specifically, the present invention relates to a glass substrate for an information recording medium formed with a plurality of textures on a surface thereof and a process for manufacturing the same.

Conventionally, a magnetic disc, which is one type of an information recording medium, is manufactured by superimposing a magnetic film on the surface of a disc-shaped glass substrate. The glass substrate is subjected to an abrasion process to smooth its surface and enable high-density and large-volume recording required for the magnetic disc. A head for reading information is more easily adhered to the magnetic disc when the surface is smoothly polished. To reduce such adherence, a texture processing is performed to form an appropriate amount of protuberances, or a texture, on the surface of the glass substrate (e.g., Japanese Laid-Open Patent Publication No. 2002-117532).

Typical conventional methods for processing a texture includes a chemical texture formation method and a mechanical texture formation method. The chemical texture formation method is a method for forming a texture by etching the glass substrate by, for example, immersing the glass substrate in an etchant containing aqueous acids and alkaline aqueous solutions. The mechanical texture formation method is a method for forming a texture by supplying an abrasive slurry to the surface of the glass substrate while slidably contacting an abrasive tape thereto using a texture machine.

Comparing the chemical texture formation method and the mechanical texture formation method, the chemical texture formation method has an advantage over the mechanical texture formation method in that the formation of the texture is more easily carried out. On the other hand, in the chemical texture formation method, in the technique for immersing the glass substrate into the etchant, the formation of a texture while accurately controlling the shape of the texture is extremely difficult. Particularly, to achieve high-density and large-volume recording, the texture must have a uniform shape and be evenly dispersed over the entire surface of the glass substrate. Further, the mechanical texture formation method is more advantageous than the chemical texture formation method in accurately controlling the shape of the texture.

However, the mechanical texture formation method is more likely to form burrs, which are projections having an abnormal height, on the texture than the chemical texture formation method, and thus has a problem in that the shape of the texture tends to be uneven due to such burrs. That is, in the case of the chemical texture formation method, the surface of the glass substrate is, theoretically, evenly etched and thus burrs are less likely to be formed. On the other hand, in the mechanical texture formation method, the burrs tend to be formed by stress applied to the surface or non-scraped sections when scraping the surface of the glass substrate with the abrasive slurry. Therefore, in the mechanical texture formation method, the formation of burrs is an important issue.

The present invention focuses on the problems existing in the prior art. It is an object of the present invention to provide a glass substrate for an information recording medium capable of suppressing the formation of burrs on a texture and a process for manufacturing the same.

SUMMARY OF THE INVENTION

To achieve the above object, one aspect of the present invention is a process for manufacturing a glass substrate for use in an information recording medium that is manufactured by polishing a surface of a disc-shaped glass substrate and then performing texture processing on the surface. The texture processing includes the steps of forming lines of a texture on the surface of the glass substrate extending along a circumferential direction of the glass substrate by performing a mechanical texture formation method in which the surface of the glass substrate is supplied with an abrasive slurry while an abrasive member slidably contacts the surface, and correcting the shape of the texture by removing burrs formed on the texture during the formation of the texture. The correction of the shape of the texture is performed by using a correcting pad made of foam of a synthetic resin having a 100% modulus of 3 to 40 MPa and scrubbing the surface of the glass substrate with the correcting pad in a direction intersecting the direction in which the texture extends.

It is preferred that an Asker C hardness of the correcting pad be 40 to 70. It is preferred that the correcting pad has a surface including a plurality of holes, the holes having a diameter of 48 to 60 μm. It is preferred that the surface of the glass substrate is scrubbed with the correcting pad over a time of 2 to 20 seconds. It is preferred that the correcting pad be made of a foam of urethane resin.

It is preferred that a washing process for removing foreign material from the surface of the glass substrate be performed before or after the step for correcting the shape of the texture.

It is preferred that the step for correcting the shape of the texture uses a scrub pad as the correcting pad and includes a scrubbing step for scrubbing the surface of the glass substrate with the scrub pad, with burrs and foreign material being removed from the surface of the glass substrate in the scrubbing step.

A further aspect of the present invention is an information recording medium glass substrate manufactured through the above manufacturing method. When a predetermined region of a surface of the glass substrate is measured with an atomic force microscope, the area of the predetermined region is referred to as a reference area, the area of a cut plane of the texture obtained by cutting the texture along a plane parallel to the surface is referred to as a measured area, the ratio of the measured area with respect to the reference area is represented by a bearing ratio (BR), a position at which the bearing ratio (BR) is 50% is referred to as a reference plane, a plane at which the texture is cut at a position where the bearing ratio (BR) is an arbitrary value (X %) is referred to as a measured plane, and height from the reference plane to the measured plane is represented by a bearing height (BH (X)). The presence of a burr is recognized in a range of bearing height BH (0.01) to bearing height BH (0.4), and the difference between the bearing height BH (0.01) and the bearing height BH (0.4) in a state in which the burr is removed from the texture is 0.01 to 1.0 nm.

DETAILED DESCRIPTION OF THE PREFERRED EMBODIMENTS

A first embodiment of the present invention will now be described with reference to the drawings.

Figure 1:
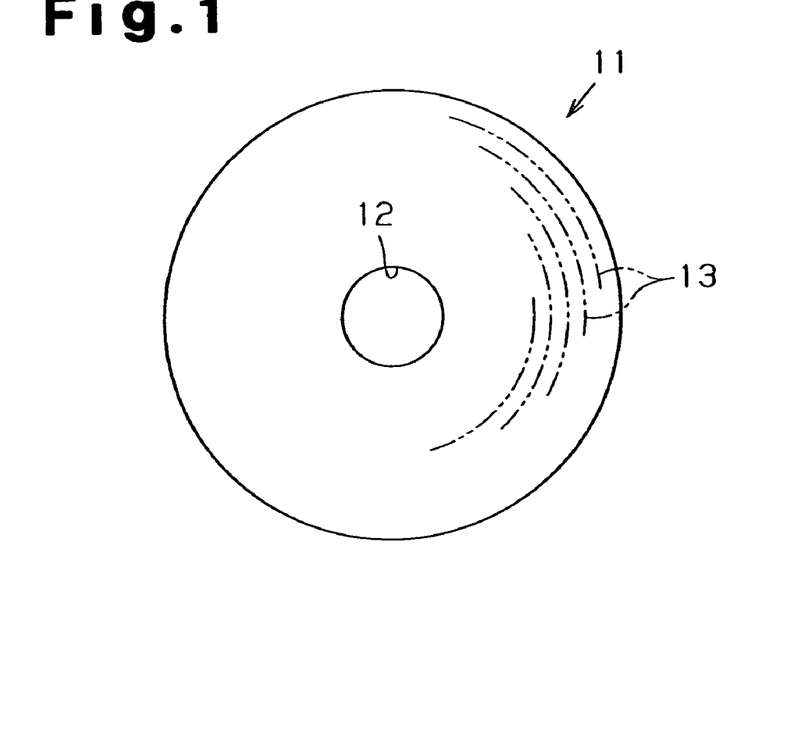
FIG. 1 is a front view showing a glass substrate for an information recording medium according to the present invention.

As shown in FIG. 1, an information recording medium glass substrate 11 (hereinafter referred to as "glass substrate 11") is disc-shaped and has a circular hole 12 at the center thereof. The glass substrate 11 is obtained by polishing and machining a raw material glass plate cut out in a disc-shape from a sheet of glass plate.

The raw material glass plate is made of a multicomponent glass material such as soda lime glass, aluminosilicate glass, borosilicate glass, or crystallized glass manufactured through a float method, a downdraw method, a redraw method, or a press method. Further, by performing texture processing on the raw material glass plate, a plurality of textures 13 are formed on a surface of the glass substrate 11. The textures 13 each extend in lines in the circumferential direction of the glass substrate 11. A magnetic film, a protective film and the like made of a metal such as cobalt (Co), chromium (Cr), and iron (Fe), or an alloy is formed on the surface of the glass substrate 11, which has the textures 13, to obtain an information recording medium, such as a magnetic disc, a magnetic optical disc, and an optical disc.

For example, to manufacture a magnetic disc, at least a magnetic layer is formed on the surface of the glass plate 11 having the texture 13. A Co ferromagnetic layer including magnetic crystals having a hexagonal closest packing (hcp) structure may be employed as the magnetic layer used for the magnetic disc.

Further, a protection layer and a lubrication layer are sequentially formed on the magnetic layer for the magnetic disc. An amorphous carbon protection layer may be employed as the protection layer. Further, the lubrication layer may contain a perfluoropolyether compound.

The glass substrate 11 including the textures 13 preferably has a micro waviness height (NRa) of 0.2 nm or less and a surface roughness (Ra) of 0.5 nm or less. The waviness height (Wa) of the surface in this case is preferably 0.5 nm or less. In the present specification, the micro waviness height NRa indicates a value measured by scanning a predetermined region of the surface using white light of measuring wavelengths ($\lambda$) of between 0.2 and 1.4 mm with a three-dimensional surface structure analyzing microscope (New View 200) manufactured by Zygo Corporation. Similarly, the surface roughness Ra indicates a value measured with an atomic force microscope (AFM). The waviness height Wa indicates a value measured by scanning a predetermined region of the surface using white light of measuring wavelengths ($\lambda$) of between 0.4 and 5.0 mm with a multifunctional disc interferometer (Optiflat) manufactured by Phase Metrix Corporation.

In the glass substrate 11, among the micro waviness height NRa, the surface roughness Ra, and the waviness height Wa, particularly, if the height NRa of the micro waviness exceeds 0.2 nm and the surface roughness Ra exceeds 0.5 nm, the surface is determined as being rough and having low smoothness. This is due to the fact that in recent information recording media, the distance between the surface of the information recording medium and the head has a tendency to be closer to achieve further high-density recording. When the head moves over the information recording medium, the head is able to follow the elevation difference of the waviness even if the waviness height Wa is somewhat large. However, if the micro waviness height NRa and the surface roughness Ra are large, the head may not be able to follow the elevation difference of the micro waviness or may not be able to jump over protuberances, and defects such as being caught in or impacting protuberances frequently occur.

Figure 8:
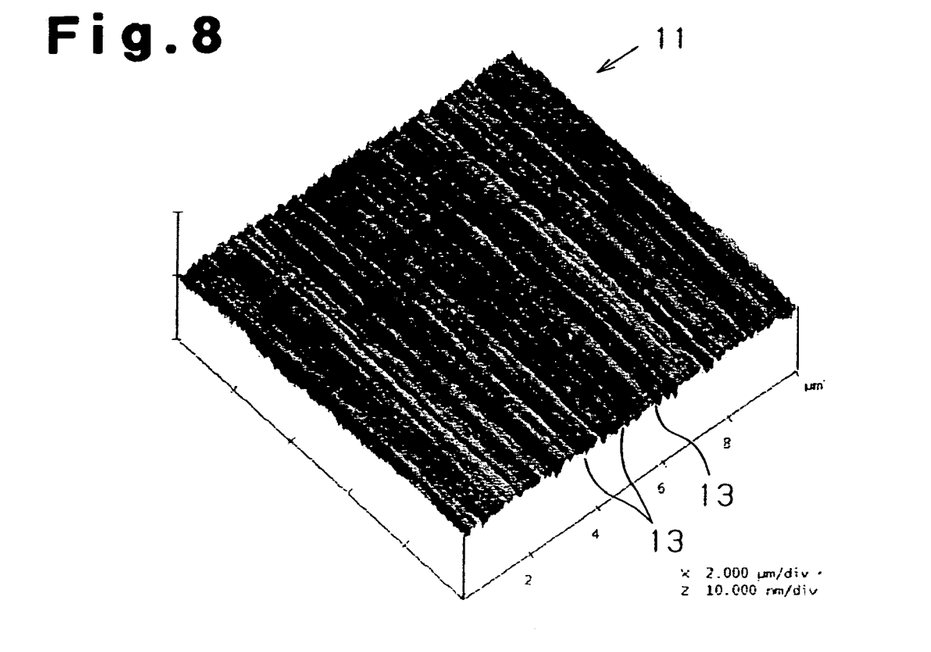
FIG. 8 is a bird's eye view taken by the AFM showing the texture from which burrs have been removed.

On the other hand, if the smoothness of the surface is extremely high, the head adheres to the surface of the information recording medium, and defects such as not being able to move thereon may occur. Thus, the textures 13 are formed to reduce the contact area with the head while smoothing the surface of the glass substrate 11. As shown in FIG. 8, the surface of the glass substrate 11 formed with the textures 13 has protuberances shaped with substantially equal heights. This smoothes the surface while reducing contact area with respect to the head. By reducing the contact area with the head, the textures 13 suppress the adherence of the head with respect to the surface of the information recording medium. Further, the textures 13 provide high magnetic anisotropy and coercive force when the information recording medium is formed from the glass substrate 11. This is thought to be because the atoms of the metal forming the magnetic film are oriented in an orderly manner in the side surface of the textures 13.

The magnetic disc of the present invention has magnetic anisotropy in a direction in which the textures 13 formed on the glass substrate 11 extend. That is, the magnetic disc is magnetically anisotropic in the circumferential direction. This is considered to be because priority is given to the orientation of the magnetic crystals forming the magnetic layer in the direction of the textures 13. Since the magnetic disc of the present invention has high magnetic anisotropy, a magnetic disc having superior record and reproduction characteristic is obtained.

In the present invention, deficiencies such as the magnetic head frequently being caught by the protuberances or hitting the protuberances are avoided. Further, the present invention prevents deficiencies such as the magnetic head being stuck to the surface of the magnetic head and disabling movement of the magnetic head. Accordingly, the present invention is especially preferable for a magnetic disc or glass substrate used as a magnetic disc that is installed in a hard disk drive (HDD) activated and de-activated in accordance with a load/unload technique (also referred to as ramp load technique).

A process for manufacturing the glass substrate will now be explained.

The glass substrate is manufactured through a machining step, an edge beveling step, a lapping step, a polishing step, a washing step, and a texture processing step.

In the machining step, a disc-shaped raw material glass plate including a circular hole at a center thereof is formed by cutting a sheet of glass plate using a cutter made of a cemented carbide or diamond. In the edge beveling step, inner and outer circumferential edges of the raw material glass plate are polished so that the outer diameter and inner diameter have predetermined dimensions and so that the corners of the inner and outer circumferential edges are polished and beveled.

In the lapping step, a lapping process is performed on the raw material glass plate with a lapping apparatus to correct the warp of the raw material glass plate as a whole so that the raw material glass plate becomes a substantially flat plate. In the polishing step, the abrasion process is performed on the raw material glass plate in a plurality of steps using a polishing apparatus to smooth the surface of the raw material glass plate. In the washing step, after being subjected to the abrasion process, the raw material glass plate is washed with a washing liquid to remove foreign materials from the surface of the glass substrate, such as an abrasive agent, abrasive powder, and dust.

In the texture processing step, the texture process is performed on the glass plate, which surface is smoothed in the polishing step, to form textures on the surface of the raw material glass plate. This manufactures the glass substrate. The texture process is performed mainly in two steps, a texture forming step for forming the texture and a scrubbing step for correcting the shape of the texture.

The texture forming step will now be explained. In the texture forming step, due to the mechanical texture formation method in which an abrasive slurry is supplied to the surface of the raw material glass plate while an abrasive member is slidably contacted thereto, the lines of textures are formed on the surface of the raw material glass plate. In the mechanical texture formation method, an apparatus known as a texture machine is used.

The texture machine will now be explained.

Figure 3A:
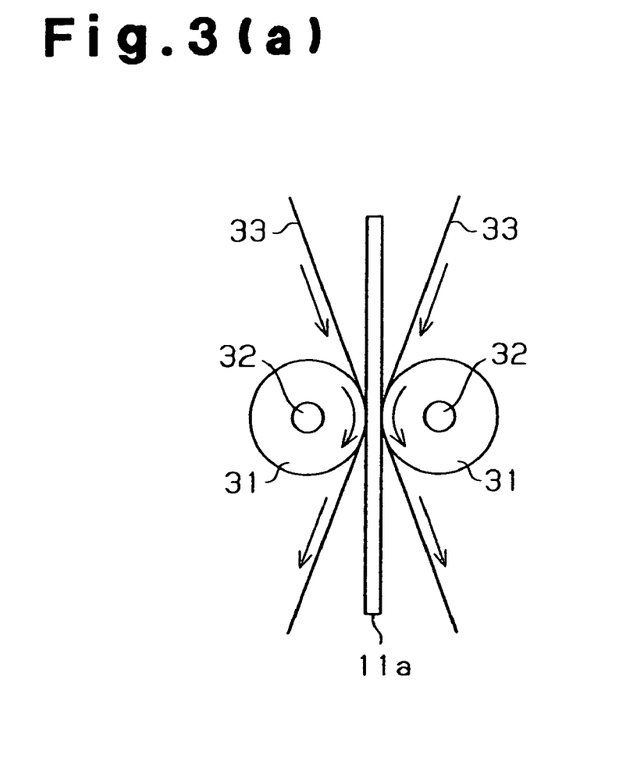
FIG. 3(a) is a schematic view showing a state seen from the side of a texture machine.
Figure 3B:
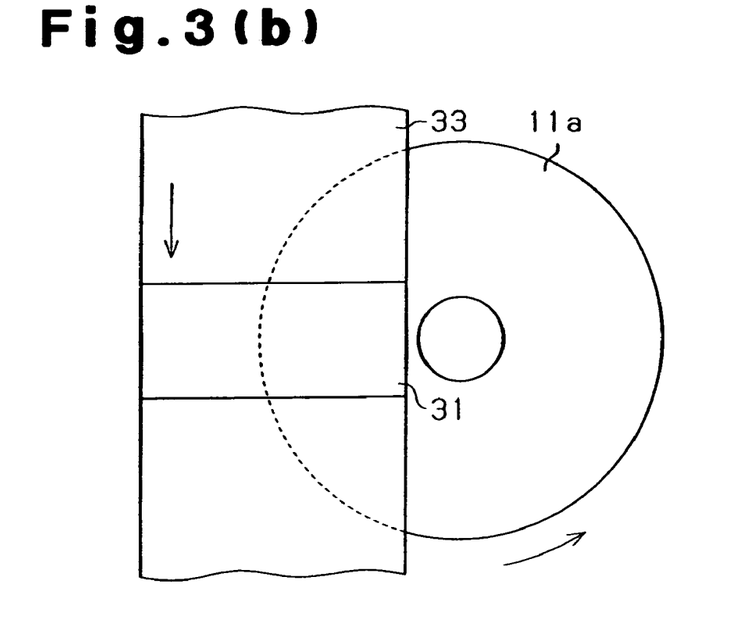
FIG. 3(b) is a schematic view showing a state seen from the front of the texture machine.

As shown in FIGS. 3(a) and 3(b), in the texture machine, the raw material glass plate 11a is rotatably supported by a spindle (not shown). A pair of rollers 31 is arranged on both sides of the raw material glass plate 11a so as to face each other and sandwich the raw material glass plate 11a. Each roller 31 is supported by a supporting member (not shown) in a freely rotatable manner about a rotation shaft 32 and extends in a radial direction of the raw material glass plate 11a. Both rollers 31 are arranged so as to be movable toward or away from the raw material glass plate 11a.

A tape member 33 serving as an abrasive member is arranged between the surface of the raw material glass plate 11a and the corresponding roller 31. The tape member 33 is arranged so as to pass between the surface of the raw material glass plate 11a and each roller 31, and move from the upper side to the lower side in FIG. 3(a). Abrasive slurry is supplied from a supplying section (not shown) to the space between the tape member 33 and the surface of the raw material glass plate 11a. Abrasive grains contained in the abrasive slurry adhere to the tape member 33.

In the texture machine, the tape member 33 slidably contacts the surface of the raw material glass plate 11a as the two rollers 31 approach the surface of the rotating raw material glass plate 11a from both sides. Due to the slidable contact of the tape member 33, the abrasive grains are pressed against the surface of the raw material glass plate 11a. Since the raw material glass plate 11a is rotated by the spindle, the surface of the raw material glass plate 11a is scraped by the abrasive grains, and a plurality of shallow fine grooves are concentrically formed in the surface thereof. The shallow fine grooves become more deeply scraped in accordance with the processing time of the texture machine, and the texture is concentrically formed at a section between the grooves.

A material having microscopic protuberances on the surface thereof such as cloth, nonwoven cloth, and flocked suede is used for the tape member 33. This is to catch the abrasive grains with the microscopic protuberances of the tape member 33 and hold the abrasive grains in the surface of the tape member 33. Further, synthetic resin such as polyurethane, polyethylene and polypropylene and natural fibers such as cotton, may be used as the material for the tape member 33. Particularly, if the material is suede, foam made of synthetic resin may also be used.

Diamond slurry obtained by dispersing the diamond abrasive grain in a medium, such as water, is mainly used as the abrasive slurry. The grain diameter of the abrasive grains is, in terms of the mean grain diameter ($D_{50}$), preferably between 0.05 and 0.3 μm, and more preferably between 0.08 and 0.25 μm. When the mean grain diameter $D_{50}$ is less than 0.05 μm, this decreases the capability for polishing the glass plate and lowers the formation speed of the texture, thus causing a decrease in yield and a rise in the processing cost. If the mean grain diameter $D_{50}$ exceeds 0.3 μm, the difference between the grain diameters of each abrasive grains becomes significant and formation of an even texture becomes difficult.

Arithmetic mean roughness (Ra), according to JIS B 0601, of the raw material glass plate 11a is preferably between 0.35 and 1.0 nm. The raw material glass plate 11a is polished so as to have such arithmetic mean roughness Ra in the polishing step, which is the step before the texture forming step. If the arithmetic mean roughness Ra is less than 0.35 nm, the abrasive grains easily slide on the surface of the raw material glass plate 11a, and the shape of the texture is not accurately controlled. If the arithmetic mean roughness Ra exceeds 1.0 nm, the glass substrate manufactured from the raw material glass plate 11a has low surface quality. That is, if the texture is formed with large protuberances on the surface, the protuberances, defects, such as dents or distortion, remain at apexes in the texture without being corrected. This lowers the surface quality, such as smoothness of the surface of the glass substrate.

The scrubbing step will now be explained. When forming the texture using the mechanical texture formation method in the texture forming step, most of the textures have uniform shapes. However, burrs formed by projections of abnormal height are formed in some of the textures. Thus, in the scrubbing step, a scrub pad serving as a correcting pad is used to remove burrs by scrubbing the surface of the raw material glass plate.

The burrs formed on the texture with the mechanical texture formation method will now be described. The abrasive grains contained in the abrasive slurry somewhat differ in grain diameter, causing a difference in the depth and width of the groove formed by each abrasive grains, and thus the shape for example, height of the texture may vary. For example, at sections where the groove is formed deep and wide, the texture is low and thin. On the other hand, at sections where the groove is formed shallow and narrow, the texture is high and thick. Particularly, in the mechanical texture formation method, when the surface of the raw material glass plate is scraped with the abrasive grains, there is a high possibility of the peripheral portion being crushed and distorted by the stress applied from the abrasive grain or raised in a cliff-shaped manner or non-scraped sections being formed.

When the shape of each texture varies, the respective ridges (apex of the texture) is also distorted in an undulated manner. The distortion tends to be uneven. Compared to the height of other ridges, abnormally high, narrow, and sharp projections exist in part of the distorted ridges. There projections are burrs. Further, such burrs are not limited to being formed on the texture in a scattered manner, and at many times, a plurality of burrs may be continuously formed along a direction in which the textures extend.

The conventional chemical texture formation method is a method for forming the texture by etching or dissolving the surface of the raw material glass plate with etchant. Therefore, the chemical texture formation method is a method in which burrs are less likely to be formed compared to the mechanical texture formation method. However, burrs may be formed when the surface of the raw material glass plate is unevenly etched. Burrs formed by the chemical texture formation method greatly differ in shape and property from burrs formed by the mechanical texture formation method since the formation method of the texture is completely different.

Figure 4A:
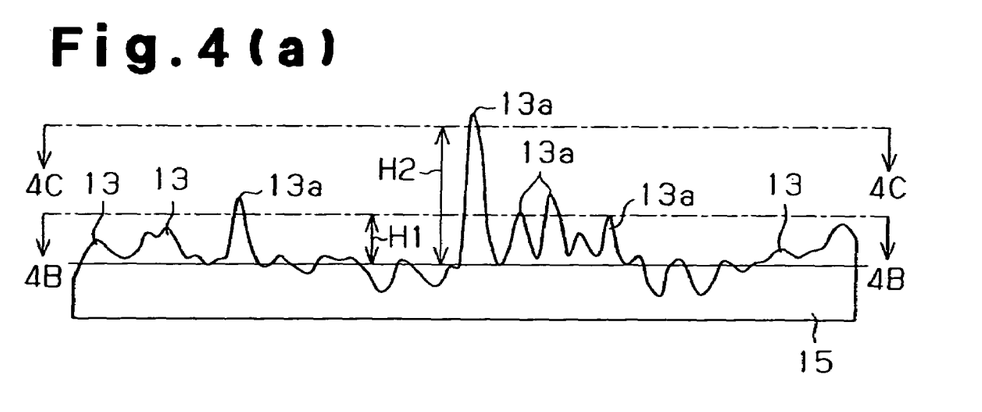
FIG. 4(a) is a schematic view showing a texture with burrs formed by a mechanical texture formation method.
Figure 5:
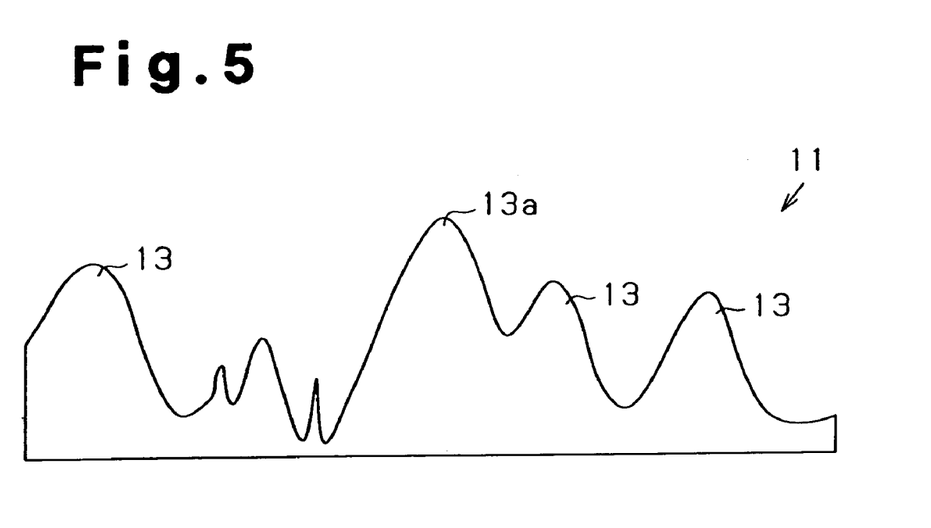
FIG. 5 is a schematic view showing the texture formed by a chemical texture formation method.

When observing the burrs formed by the chemical texture formation method in detail, a burr 13a has a rounded mountain-shape, as shown in FIG. 5. That is, the burr 13a formed by the chemical texture formation method has a shape that is not affected by the external force applied from the scrub pad when scrubbing is performed and is thus difficult to remove. The burr 13a formed by the mechanical texture formation method, on the other hand, has a narrow and sharp projecting-shape, as shown in FIG. 4(a). Therefore, the burr 13a formed by the mechanical texture formation method is affected by the external force applied from the scrub pad. As a result, sufficient external force easily removes the burr 13a.

A layer different in chemical property with an internal composition of the raw material glass plate is formed by the etchant on the surface of the burr 13a using the chemical texture formation method to protect the burr, which is thus difficult to remove unless a strong external force is applied thereto. Since the burr 13a formed by the mechanical texture formation method is formed by scraping the rim with the abrasive grains, a microscopic crack is formed on the surface thereof. Thus, the burr 13a is split away and removed from its base by simply applying a weak external force. Accordingly, although the mechanical texture formation method is more likely to form burrs compared to the chemical texture formation method, the burrs are sufficiently removable in the scrubbing step.

Figure 2:
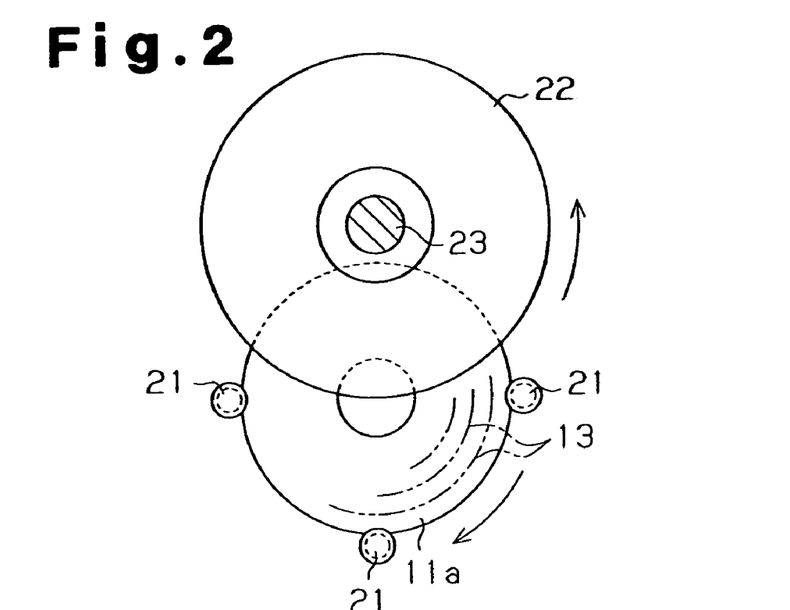
FIG. 2 is a schematic view showing a scrubbing device.

In the scrubbing step, a scrubbing device shown in FIG. 2 is used. In the scrubbing device, the raw material glass plate 11a is supported by three supporting shafts 21 at a total of three portions, a lower portion and two side portions. Further, the raw material glass plate 11a is simply supported and not fixed by each supporting shaft 21 in this state, and thus is rotatable within the three supporting shafts 21 by applying an external force.

The circular scrub pad 22 is arranged on the surface of the raw material glass plate 11a. The scrub pad 22 is supported by a shaft 23 extending parallel to the supporting shaft 21. The shaft 23 is connected to a driving device (not shown). When a driving force is transferred from the driving device through the shaft 23, the scrub pad 22 is rotated about the shaft 23 in the direction shown by the arrow in the drawing. Further, the scrub pad 22 is moved in the radial direction of the raw material glass plate 11a with respect to the raw material glass plate 11a so that the outer circumference overlaps the center of the raw material glass plate 11a and so that substantially half of the scrub pad contacts the raw material glass plate 11a.

In the scrubbing device, when the scrub pad 22 is rotated, a rotation force is applied to the raw material glass plate 11a contacting the scrub pad 22 so that the raw material glass plate 11a is rotated in a direction opposite the rotation direction of the scrub pad 22. In this state, since the textures 13 are formed on the surface of the raw material glass plate 11a so as to extend in the circumferential direction, the raw material glass plate 11a is scrubbed by the scrub pad 22 in a direction intersecting the direction in which the texture 13 extends. The slidable contact of the scrub pad 22 splits off and removes burrs from the textures 13.

To remove the burr from a texture 13, the raw material glass plate 11a must be scrubbed with the scrub pad 22 in the direction intersecting the direction in which the texture 13 extends.

Figure 7:
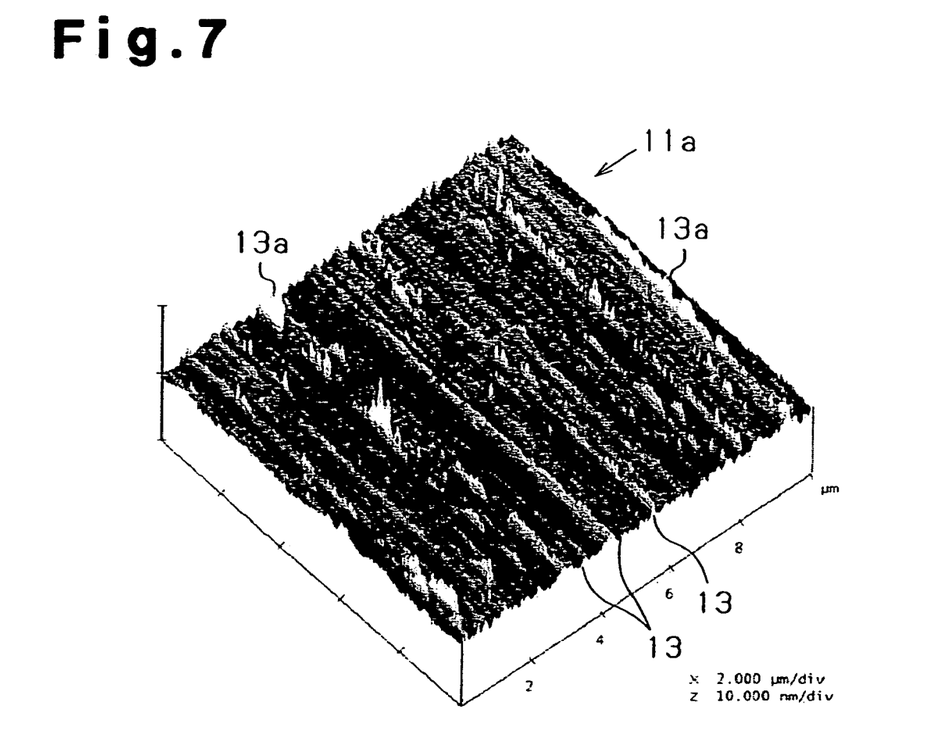
FIG. 7 is a bird's eye view taken by an atomic force microscope (AFM) showing the texture on which the burr is formed.

More specifically, as shown in FIG. 7, the mechanical texture formation method forms most of the burrs 13a continuously in a direction in which the textures 13 extend and have wall-like shapes extending in the same direction as the texture 13. When removing such burrs 13a, if the raw material glass plate 11a is scrubbed with the scrub pad 22 in the direction in which the textures 13 extend, or in the circumferential direction, some of the burrs 13a may not be removed. This is believed to be because other burrs 13a deform the surface of the scrub pad 22 and the scrub pad 22 may not contact some of the burrs 13a. Alternatively, the removed burrs 13a may result in interference such that the external force is not received from the scrub pad 22. If the raw material glass plate 11a is scrubbed with the scrub pad 22 in the direction intersecting the direction in which the textures 13 extend, the burrs 13a contact the scrub pad 22 so as to receive the external force from the scrub pad 22. Therefore, more burrs 13a are split away, and the removal of the burrs 13a is ensured.

A sponge made of a foam of a synthetic resin or a suede material are used for the scrub pad 22. When analyzing in detail the situation in which the burrs 13a are removed by the scrub pad 22, a burr 13a first enters a hole formed in the surface of the scrub pad 22 and is then split away when contacting a wall that forms the hole in a lateral direction. From a microscopic point of view, a material hard enough to withstand the strength of the burr 13a on the surface of the raw material glass plate 11a when contacting the burr 13a is used for the scrub pad 22. From a microscopic point of view, the term hard refers to the wall of the hole being hard, that is, the material of the scrub pad 22 being hard.

Therefore, a synthetic resin material having 100% modulus, indicating the hardness of the material, according to JIS K 6256, of between 3 to 40 MPa is used for the scrub pad 22. If the material is such in which the 100% modulus is less than 3 MPa, the burrs 13a can not be sufficiently removed. If a material in which the 100% modulus exceeds 40 MPa is used, not only the burrs 13a but also the texture 13 may be scraped thus affecting the shape of the texture 13.

Urethane resin is preferably used for the material of the scrub pad 22. This is because, if of the same kind, in the urethane resin, crystallization of the molecule in the resin is more advanced as the value of the 100% modulus becomes higher, and thus from a microscopic view, the hardness of the scrub pad 22 increases. Types of urethane resin include polyester urethane resin, polyether urethane resin, and polycarbonate urethane resin depending on the starting material. Among these resins, polycarbonate urethane resin is more preferably used for the material of the scrub pad 22. This is because polycarbonate urethane resin has superior chemical-resistance property compared to the other resins, and, for example, when using a washing liquid such as aqueous acid and alkaline aqueous solution in the scrubbing step, microscopically, the hardness of the surface is maintained.

Further, it is preferred that the scrub pad 22 have a surface in which the diameter of the holes is between 48 to 60 μm. As the diameter of the hole increases, the wall forming a hole becomes thinner and the hardness from the microscopic point of view lowers. Thus, when the diameter exceeds 60 μm, the burrs 13a are not sufficiently removed.

As the hole diameter becomes smaller, the wall forming the hole becomes thicker and hardness from the microscopic point of view increases. Thus, when the diameter is less than 48 μm, the texture 13 may be scraped thus affecting the shape thereof.

In the present embodiment, in addition to removing the burr, the scrubbing step is performed to eliminate the removed burrs 13a and foreign materials, such as abrasive powder and abrasive slurry produced during texture formation, from the surface of the raw material glass plate 11a. Thus, in the scrubbing step of the present embodiment, the foreign materials on the surface are scrubbed off and removed by showering washing liquid onto the surface of the raw material glass plate 11a and scrubbing the surface with the scrub pad 22.

The washing liquid includes water, purified water, and neutral aqueous solution, such as alcohol, for example, isopropyl alcohol. Other neutral aqueous solutions include electrolytic water obtained by electrolyzing an aqueous solution of inorganic salt, such as alkali metal salt, for example, sodium chloride, or function water, such as gas dissolved in water. Further, an alkaline aqueous solution or an aqueous acid having a capability for etching a glass material may also be used as the washing liquid. In this case, an alkali aqueous solution such as calcium hydroxide aqueous solution, having a low capability for etching a glass material is preferably used.

To remove burrs 13a and scrub off foreign materials without affecting the shape of the textures 13, from a macroscopic point of view of the scrub pad 22 as a whole, softness to an extent so as not to scrape off the textures 13 is required for the scrub pad 22. Thus, when formed with the above mentioned material, a scrub pad 22 having an Asker C hardness according to SRISO101, serving as a value indicating the hardness of the scrub pad 22 as a whole, is between 40 and 70 is preferably used. If the Asker C hardness is less than 40, not only burrs 13a, but foreign materials may also not be sufficiently removed. If the Asker C hardness exceeds 70, not only burrs 13a and foreign materials, but the textures 13 may also be scraped off.

The time for scrubbing the surface of the raw material glass plate 11a with the scrub pad 22 is preferably 2 to 20 seconds. As mentioned above, burrs 13a formed through the mechanical texture formation method are more easily removed than those formed through the conventional chemical texture formation method. Thus, if the surface of the raw material glass plate 11a is scrubbed with the scrub pad 22 over an extremely long time, or over 20 seconds, upper portions of the textures 13, from which the burrs 13a have been removed, are scraped off, thus affecting the shape of the textures 13. If the surface of the raw material glass plate 11a is scrubbed with the scrub pad 22 for an extremely short time, or for less than 2 seconds, burrs 13a and foreign materials may not be sufficiently removed, thus lowering the quality of the glass substrate 11 obtained.

When scrubbing the surface of the raw material glass plate 11a with the scrub pad 22, the contact pressure between the scrub pad 22 and the raw material glass plate 11a is preferably 4.9 to 49 kPa. This contact pressure is adjusted by varying the shape, thickness, and etc. of the scrub pad 22. That is, the contact pressure may be adjusted by forming concentric grooves on the surface of the scrub pad 22 that contacts the raw material glass plate 11a or by increasing and decreasing the thickness of the scrub pad 22. If the contact pressure is lower than 4.9 kPa, deficiencies such as the operation time relating to the scrubbing step becoming longer or the burrs 13a and foreign materials may not be sufficiently removed. If the contact pressure is higher than 49 kPa, deficiencies such as the texture shape being affected, contact scratches being formed in the surface, and breakage of the raw material glass plate 11a may occur.

The rotation speed of the scrub pad 22 is preferably between 10 to 500 revolutions per minute ($min^{-1}$). If the rotation speed is too low or too high, the scrub pad 22 may be lifted away from the surface of raw material glass plate 11a or the scrub pad 22 may excessively contact the surface of the raw material glass plate 11a. Thus, the contact state of the scrub pad 22 is likely to be uneven. This may result in deficiencies such as insufficient removal of the burrs 13a and foreign materials or the formation of contact scratches.

A method for measuring the presence of burrs on the textures will now be explained.

To measure the presence of burrs, a method using a bearing ratio (BR) and a bearing height (BH) obtained from the measurement result of the AFM is used. In the AFM, a roughness curve is obtained for every scanning line in compliance with JIS B0601. Based on the roughness curves, the protuberances of the surface of the raw material glass plate 11a are shown as a bird's eye view. According to the method using the bearing ratio BR and the bearing height BH, the shape of the textures may be observed in addition to the presence of burrs. The bearing ratio BR will first be explained below.

To obtain the bearing ratio BR, the surface condition at a predetermined region of the surface of the raw material glass plate 11a is first measured using the AFM. The area of the measured predetermined region is used as a reference area. For instance, if the measured predetermined region is 10 μm square, the reference area is 100 $μm^2$.

Figure 4B:
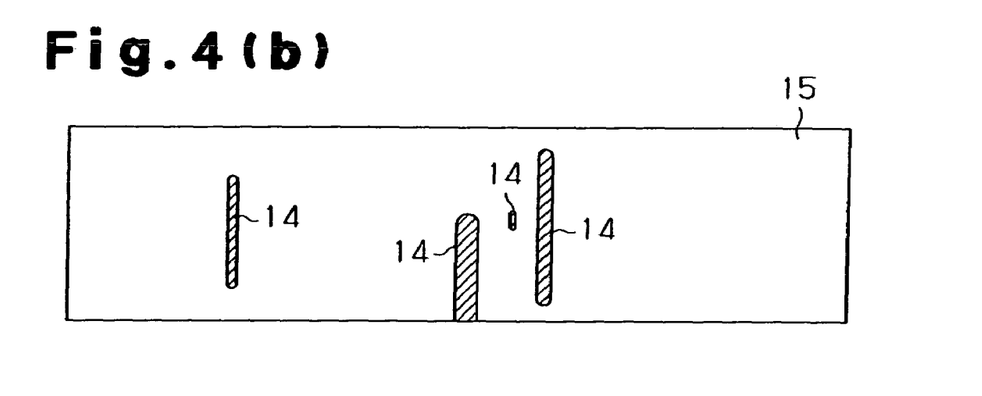
FIG. 4(b) is a cross sectional view taken along line 4B—4B of FIG. 4(a)
Figure 4C:
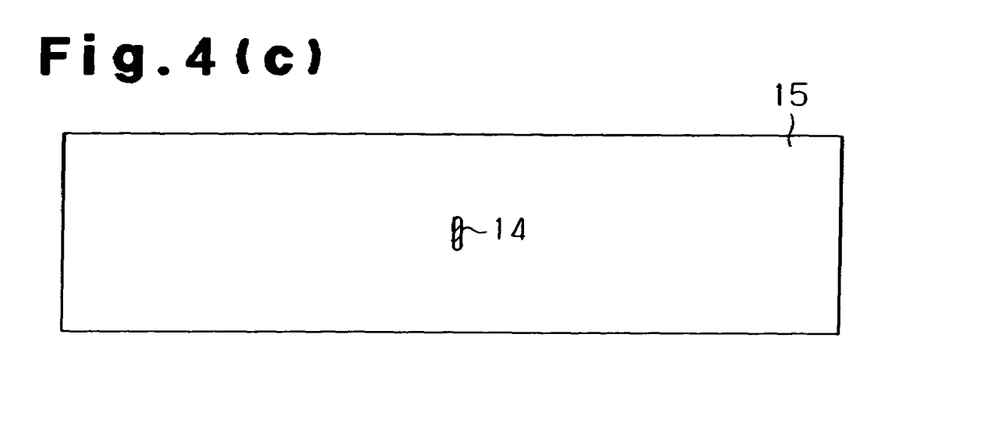
FIG. 4(c) is a cross sectional view taken along line 4C—4C of FIG. 4(a)

Secondly, as shown in FIGS. 4(a) to 4(c), an image of each texture 13 is cut along a plane parallel to the surface of the raw material glass plate 11a. Each cut plane 14 taken when the image of each texture 13 is cut along a plane including line 4B—4B line in FIG. 4(a) is shown in FIG. 4(b), and the cut plane 14 taken when the texture 13 is cut along a plane including line 4C—4C line is shown in FIG.

4(c). Subsequently, the total area of the cut planes 14 in each texture 13 is calculated. The total area of the cut planes 14 is the measured area.

The ratio of the measured area with respect to the reference area is indicated as the bearing ratio BR. For instance, if the ratio of the measured area with respect to the reference area is 50%, the bearing ratio BR is 50%, and if the ratio is 0.01%, the bearing ratio BR is 0.01%.

The bearing height BH will now be explained.

To obtain the bearing height BH, the position at where the bearing ratio BR is 50% is first obtained. The position at where the bearing ratio BR is 50% is the reference plane 15 shown in FIG. 4(a). Secondly, a plane along which each texture is cut when the bearing ratio BR is a predetermined value is obtained. The plane along which each texture is cut is the measured plane. In FIG. 4(a), the plane including line 4B—4B or the plane including the line 4C—4C is the measured plane. The height from the above mentioned reference plane 15 to the measured plane when the bearing ratio BR is X % is indicated as a bearing height BH (X). For instance, when the plane including line 4B—4B is the measured plane, if the bearing ratio BR is 10%, the bearing height is BH (10). If the height H1 from the reference plane 15 to the measured plane including line 4B—4B is 0.5 nm, the bearing height BH (10) is 0.5 nm. Further, when the plane including line 4C—4C is the measured plane, if the bearing ratio BR is 0.1%, the bearing height is BH (0.1). If the height H2 from the reference plane 15 to the measured plane including line 4C—4C is 1.5 nm, the bearing height BH (0.1) is 1.5 nm.

Figure 9:
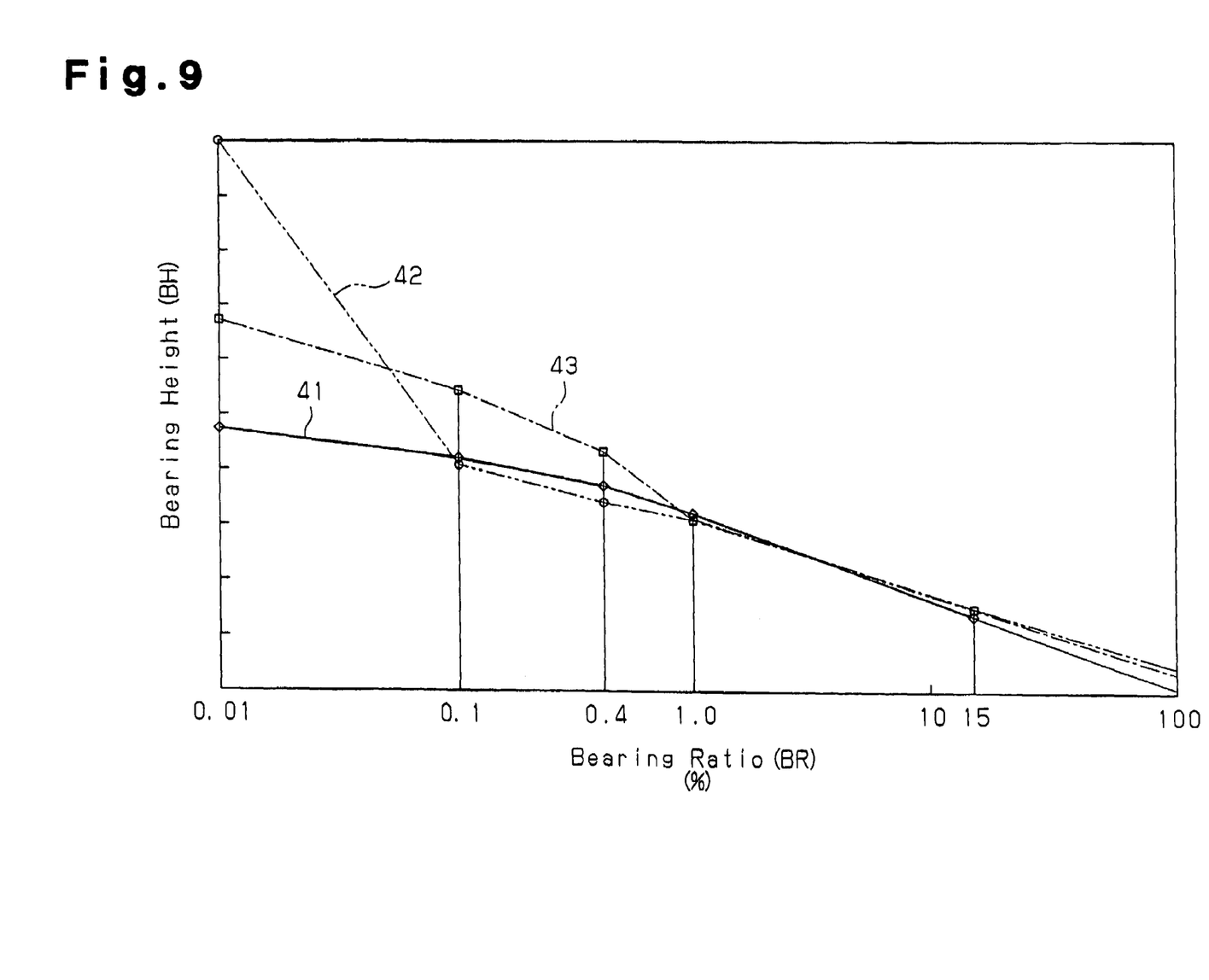
FIG. 9 is a graph showing the relationship between a bearing ratio BR and a bearing height BH.

FIG. 9 is a graph showing the relationship of the bearing ratio BR (units of %) and the bearing height BH (units of nm) measured as described above. As shown in FIG. 4(a), the textures 13 are ridge-shaped. Thus, as the bearing ratio BR becomes greater, the basal side (bottom) of the textures 13 becomes closer and the bearing height BH (X) becomes smaller. On the contrary, as the bearing ratio BR becomes smaller, an upper end side (apex) of the textures 13 becomes closer and the bearing height BH (X) becomes greater. The bearing ratio BR and the bearing height BH (X) has the relationship as shown by the solid line 41 in FIG. 9. The relationship shown by the solid line 41 is hereinafter referred to as the reference line 41.

Figure 6:
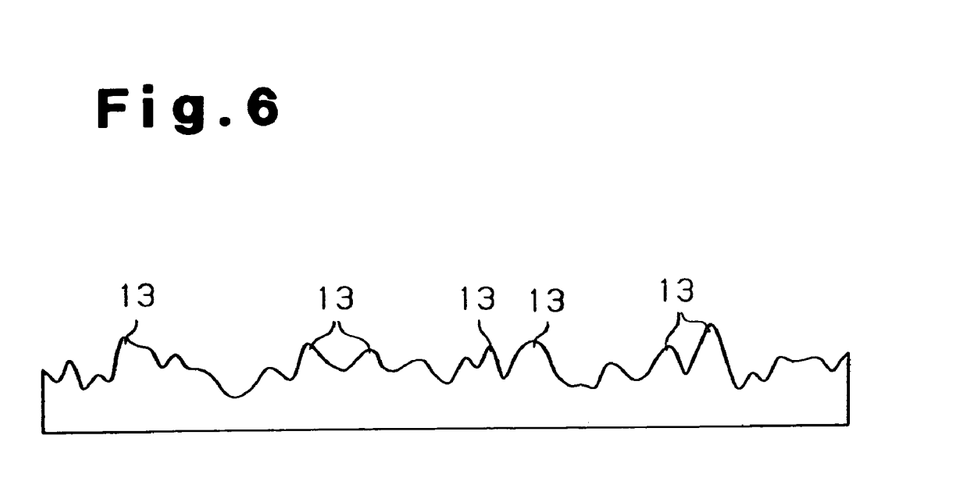
FIG. 6 is a schematic view showing the texture from which burrs have been removed.

As shown in FIG. 6, if the textures 13 have satisfactory shapes, that is, have a ridge-shape of a constant gradient and are free from burrs and dents, the relationship between the bearing height and the bearing ratio is represented mostly in a generally linear manner as with the reference line 41. As the bearing ratio BR becomes smaller, the slope of the reference line 41 becomes gradual. On the other hand, as shown in FIG. 4(a), when thin burrs project from the textures 13, as the bearing ratio BR becomes smaller, the bearing height BH (X) increases suddenly. Thus, the relationship between the bearing ratio BR and the bearing height BH is as indicated by a first abnormal line 42, which is the double-dash line in FIG. 9. The relationship shown by the first abnormal line 42 is frequently seen when burrs are formed by the mechanical texture formation method.

As shown in FIG. 5, distortion of the apexes of the textures 13 results in part of the textures 13 projecting from the textures 13. This forms burrs 13a and increases the bearing height BH (X) in a sudden manner. In this case, the relationship between the bearing height BH and the bearing ratio BR is as indicated by a second abnormal line 43, which is the single-dash line in FIG. 9. The relationship shown with the second abnormal line 43 is frequently seen when the burr is formed by the chemical texture formation method.

Therefore, the presence of burrs and the texture shape is measured by obtaining a plurality of bearing heights BH (X) for each different bearing ratio BR and analyzing the difference between two arbitrarily selected bearing heights BH (X). With regards to the raw material glass plate during manufacturing, by maintaining the difference of the plurality of BH (X) obtained for each different BR at a predetermined value, the formation of burrs is prevented and the texture shape becomes uniform.

More specifically, the presence of burrs is recognized in a range of BH (0.01) to BH (0.4). This has been derived for the first time by the inventor of the present application as a result of analyzing the bird's eye view taken by the AFM, as shown in FIG. 7, and the relationship between BR and BH (X), as shown in FIG. 9. That is, referring to FIG. 7, thinly projecting portions are observed at many locations on the ridges of the textures 13. When regarding such portions as burrs 13a, the burrs 13a exist within a range of BH (0.01) to BH (0.4).

For instance, the difference of two BH (X), or a first difference (BH (0.01)–BH (0.4)), must be 0.01 to 1.0 nm. If the first difference BH (0.01)–BH (0.4) is less than 0.01 nm, each texture 13 is formed so it has a substantially trapezoidal cross section with a flat upper end. If the first difference (BH (0.01)–BH (0.4)) exceeds 1.0 nm, the thin projecting portions or burrs 13a are formed on the texture 13. The formation of the burrs is prevented by having the first difference (BH (0.01)–BH (0.4)) between 0.01 to 1.0 nm.

With regards to the texture shape, the second difference (BH (0.4)–BH (1.0)) is preferably between 0.15 and 0.20 nm. If the second difference (BH (0.4)–BH (1.0)) is less than 0.15 nm, sections at where the bearing height BH increases suddenly occur with high probability at positions where the bearing ratio BR is less than 0.4%, and the highly projecting portions may be formed in the ridges of the textures 13. If the second difference (BH (0.4)–BH (1.0)) exceeds 0.2 nm, the bearing height BH does not rise with high probability at a position where the bearing ratio BR is less than 0.4%, and low dented portions may be formed in the ridges of the textures.

With regards to the shape of the texture, it is preferred that the second difference (BH (0.4)–BH (1.0)) be between 0.17 and 0.20 nm and that the first difference (BH (0.01)–BH (0.4)) be preferably between 0.2 and 0.7 nm. For instance, when burrs having a shape similar to those formed in the chemical texture formation method are formed, the presence of the burr can not be sufficiently recognized based on the first difference (BH (0.01)–BH (0.4)). Further, as mentioned above, even if the first difference (BH (0.01)–BH (0.4)) satisfies the range of 0.01 to 1.0 nm, and the second difference (BH (0.4)–BH (1.0)) satisfies the range of 0.15 to 0.20 nm, when a relationship line of the bearing ratio BR and the bearing height BH is plotted, for example, a line connecting BH (1.0) and BH (0.01) may not be like the above mentioned reference line 41. To evaluate the shape of the texture in more detail, in addition to the relationship between the second difference (BH (0.4)–BH (1.0)) and the first difference (BH (0.01)–BH (0.4)), each related position or BH (0.01), BH (0.4) and BH (1.0) are preferably confirmed. If both the first difference (BH (0.01)–BH (0.4)) and the second difference (BH (0.4)–BH (1.0)) satisfy the above mentioned ranges and the position of BH (0.4) with respect to both differences is substantially equal, the relationship between the bearing ratio and the bearing height is substantially linear and a texture with a constant gradient may be formed.

In addition, the value of a third difference (BH (1.0)–BH (15.0)) is preferably greater than the value of the second difference (BH (0.4)–BH (1.0)). If the value of the third difference (BH (1.0)–BH (15.0)) is smaller than the value of the second difference (BH (0.4)–BH (1.0)), the relationship line of the bearing ratio BR and the bearing height BH curves downward. In this case, the thin projecting burrs 13a may be continuously formed in the direction in which the textures 13 extend.

As shown in FIG. 9, in a range in which the above mentioned bearing ratio BR is 0.4 to 15.0%, it is preferred that the bearing height BH (X) changes in a linear manner. In this case, most of the textures 13 are formed having a ridge-shape with a constant gradient.

The present embodiment has the advantages described below.

With the glass substrate 11 of the above embodiment, when performing texture processing on the surface of the glass substrate 11, since the mechanical texture formation method is used, the textures 13 are formed so that their shapes are accurately controlled. However, since the mechanical texture formation method is used, the burrs 13a, or projections having an abnormal height, will be formed on the texture 13 with a high probability. In the texture processing, after the textures 13 are formed, the surface of the raw material glass plate 11a is scrubbed with the scrub pad 22, the material of which is synthetic resin having a 100% modulus of 3 to 40 MPa. When the raw material glass plate 11a is scrubbed with the scrub pad 22, the burrs 13a are split away and removed by the scrub pad 22. Therefore, the formation of the burrs 13a on the textures 13 is suppressed.

Further, the manufactured glass substrate 11 has a first difference (BH (0.01)–BH (0.4)) of 0.01 to 1.0 nm. Thus, the formation of burrs 13a on the texture 13 is suppressed.

The scrub pad 22 has an Asker C hardness of 40 to 70. Thus, when scrubbing the surface of the raw material glass plate 11a with the scrub pad 22, the surface is prevented from being damaged by the scrub pad 22.

The scrub pad 22 to be used has a surface with holes having a diameter of 48 to 60 μm, and the thickness of the walls forming the holes is adjusted. Thus, while preventing the surface of the raw material glass plate 11a from being damaged by the scrub pad 22, the removal of the burrs 13a is ensured.

The time for scrubbing the surface of the raw material glass plate 11a with the scrub pad 22 is 2 to 20 seconds. The burrs 13a formed by the mechanical texture formation method are easily split away and removed. Thus, with the appropriate scrubbing time, removal of the burrs 13a is ensured and the surface of the raw material glass plate 11a is prevented from being damaged by the scrub pad 22.

The scrub pad 22 made of foam with urethane resin for the material is used. Thus, 100% modulus is reliably set between 3 and 40 MPa.

A magnetic disc and a method for manufacturing the magnetic disc will now be described in detail.

Figure 10:
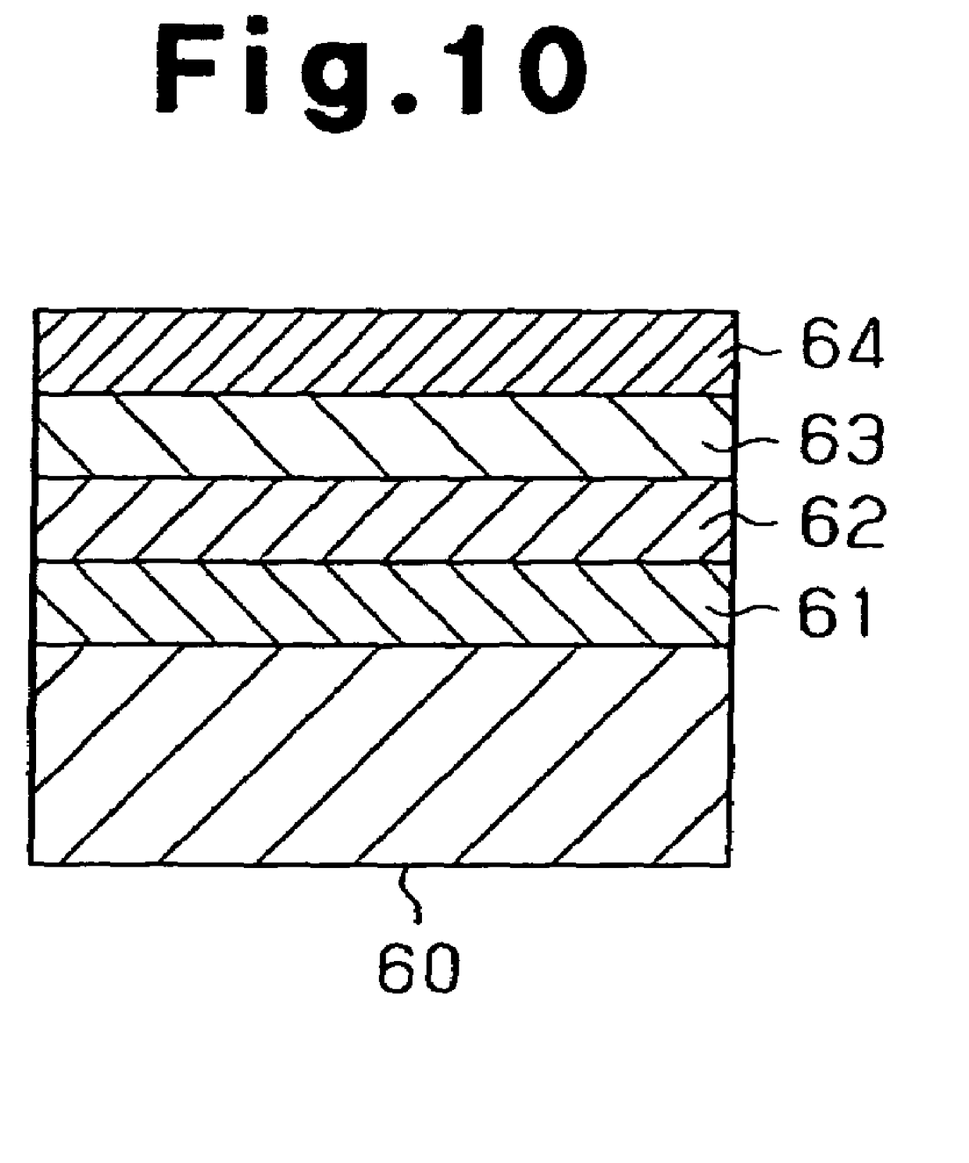
FIG. 10 is a cross sectional view of a magnetic disc.

FIG. 10 shows a magnetic disc 60, which functions as an information recording medium. The magnetic disc 60 is installed in a hard disk drive (HDD) and is used to record and reproduce information. An underlayer 61, a magnetic layer 62, a protection layer 63, and a lubrication layer 64 are formed in this order on the surface of the glass substrate 1.

In an in-plane recording magnetic disc, an underlayer having a Cr body centered cubic (bcc) structure is used as the underlayer 61. When necessary, a second underlayer may be formed between the glass substrate 1 and the underlayer 61. An underlayer having a B2 crystal structure and an amorphous underlayer may be used solely or superimposed with each other to form the second underlayer. The magnetic layer 62 is a Co ferromagnetic layer including magnetic crystals having a hexagonal closest packing (hcp) structure. Specifically, the magnetic layer 62 is a Co—Cr—Pt alloy magnetic layer.

The protection layer 63 is an amorphous carbon protection layer formed from hydrogenated nitrous carbon. The lubrication layer 62 contains a perfluoropolyether compound. The lubrication layer 62 contains as a main component an alcohol degenerated perfluoropolyether compound that includes a hydroxyl as a function at two terminal ends of a perfluoropolyether main chain.

In the magnetic disc 60, the surface of the glass substrate 1 undergoes sputtering to form the underlayer 61 and the magnetic layer 62 in this order. Then, plasma chemical vapor deposition (CVD) is performed to form the protection layer 63. Subsequently, dipping is performed to form the lubrication layer 64 on the protection layer 63. The magnetic disc 60 is manufactured in this manner.

In the magnetic disc 60, when comparing the coercive force in the circumferential direction with that in the radial direction, the coercive force in the circumferential direction is greater. In other words, the magnetic disc 60 has magnetic anisotropy in the circumferential direction. The coercive force may be measured by a vibrating sample magnetometer (VSM).

The magnetic disc 60 is optimal for use as a magnetic disc installed in a hard disk drive (HDD) activated and de-activated in accordance with the load/unload technique. This is because deficiencies such as the magnetic head frequently being caught by the protuberances or hitting the protuberances are avoided and deficiencies such as the magnetic head being stuck to the surface of the magnetic head and disabling movement of the magnetic head are prevented.

EXAMPLES

Examples further incorporating the above embodiment will now be explained.

Textures were formed on the surface of the raw material glass plate made of aluminosilicate glass produced through the float method in accordance with the mechanical texture formation method using the texture machine shown in FIGS. 3(a) and 3(b). The composition of the glass plate was 63 mol % of $SiO_2$, 16 mol % of $Al_2O_3$, 11 mol % of $Na_2$, 4 mol % of $Li_2O$, 2 mol % of MgO, and 4 mol % of CaO. Further, the raw material glass plate has a thickness of 0.65 mm, an outer diameter of 65 mm, and an inner diameter 20 mm. In the mechanical texture formation method, the abrasive agent included diamonds, and the abrasive grains that were used had a mean grain diameter of 0.2 μm.

Subsequently, the burrs 13a were scrubbed off the surface of the raw material glass plate with the scrub pad 22, which was made of polyurethane (PU) having a 100% modulus of 20 MPa, in the scrubbing device shown in FIG. 2 to obtain a glass substrate. This was used as the sample of example 1.

A glass substrate for comparative example 1 was obtained as a sample by performing the same processing as example 1 except for the point that the textures were formed with the chemical texture formation method.

With regards to example 1 and comparative example 1, the first difference (BH (0.01)–BH (0.4)) of the glass plate measured before scrubbing with the scrub pad 22 was 4.3 nm in example 1 and 4.6 nm in comparative example 1. Subsequently, the raw material glass plate was scrubbed with the scrub pad 22 for 0.5 seconds, and the measured first difference (BH (0.01)–BH (0.4)) was 3.6 nm in example 1 and 4.1 nm in comparative example 1. That is, in example 1, burrs were removed by a height of 0.7 nm in 0.5 seconds. However, in comparative example 1, burrs were removed by only a height of 0.5 nm. Thereafter, when measuring at 1 second, 1.5 seconds, and 2 seconds, the first difference (BH (0.01)–BH (0.4)) was 2.1 nm, 2.0 nm, and 1.9 nm, respectively. In the comparative example, it was 3.9 nm, 2.5 nm, and 2.4 nm, respectively. The results apparently showed that the burrs formed by the mechanical texture formation method were more easily removed than the burrs formed by the chemical texture formation method.

Next, the same processing as example 1 was performed and the surface of the raw material glass plate 11a was scrubbed with the scrub pad 22 in a direction intersecting the direction in which the textures 13 extend to obtain a sample for example 2. A raw material glass plate 11a was scrubbed in the direction in which the textures 13 extend to obtain a sample for comparative example 2. The first difference (BH (0.01)–BH (0.4)) before scrubbing with the scrub pad 22 was 4.4 nm in example 2 and 4.5 nm in comparative example 2. The first difference (BH (0.01)–BH (0.4)) after scrubbing with the scrub pad 22 was 2.3 nm in example 2 and 3.6 nm in comparative example 2. Such results showed that when scrubbing the surface of the raw material glass plate 11a with the scrub pad 22, which serves as a correcting pad, the removal of burrs is ensured by scrubbing in the direction intersecting the direction in which the textures 13 extend.

Burrs were removed without scrubbing with the scrub pad 22 in comparative example 3. In comparative examples 4 and 5 and in examples 3 to 21, the pad material of the scrub pad 22 and the operation time were as shown in table 1 when removing burrs. Table 1 also shows the 100% modulus in each pad material. The first difference (BH (0.01)–BH (0.4)) was then measured. The results are shown in table 1. In table 1, PU refers to polyurethane and PVA refers to polyvinyl alcohol.

TABLE 1

| | Pad material | 100% modulus (MPa) | Work time (sec) | BH0.01–BH0.4 (nm) |
|---|---|---|---|---|
| Comp. Ex. 3 | — | — | — | 1.50 |
| Comp. Ex. 4 | PVA | 1.5 | 20 | 1.40 |
| Comp. Ex. 5 | PVA | 1.5 | 18 | 1.30 |
| Example 3 | PU | 17 | 2 | 0.60 |
| Example 4 | PU | 17 | 4 | 0.66 |
| Example 5 | PU | 17 | 6 | 0.68 |
| Example 6 | PU | 17 | 8 | 0.58 |
| Example 7 | PU | 17 | 10 | 0.46 |
| Example 8 | PU | 17 | 14 | 0.52 |
| Example 9 | PU | 17 | 20 | 0.47 |
| Example 10 | PU | 17 | 6 | 0.68 |
| Example 11 | PU | 17 | 7 | 0.56 |
| Example 12 | PU | 20 | 2 | 0.30 |
| Example 13 | PU | 13 | 2 | 0.32 |
| Example 14 | PU | 13 | 10 | 0.48 |
| Example 15 | PU | 9 | 2 | 0.43 |
| Example 16 | PU | 9 | 6 | 0.56 |
| Example 17 | PU | 9 | 10 | 0.41 |
| Example 18 | PU | 20 | 6 | 0.45 |
| Example 19 | PU | 20 | 10 | 0.44 |
| Example 20 | PU | 20 | 20 | 0.45 |
| Example 21 | PU | 20 | 40 | 0.40 |

The results of table 1 shown that in comparative examples 4 and 5, in which the 100% modulus is 1.5 MPa, the first difference (BH (0.01)–BH (0.4)) was respectively 1.4 nm and 1.3 nm and high. Thus, the burrs were barely removed. In examples 3 to 21, the first difference (BH (0.01)–BH (0.4)) was within a range of 0.01 and 1.0 nm, and the burrs were thus removed. The results showed that the burrs were effectively removed by setting the 100% modulus of the material used for the correcting pad between 3 and 40 MPa.

The above embodiment may be modified as described below.

To satisfy impact-resistance, oscillation-resistance, heat-resistance, and the like required for the information recording medium, a chemical strengthening treatment may be performed on the raw material glass plate in a step before the texture processing or in a step after the texture processing. The chemical strengthening treatment refers to a treatment for ion converting a monovalent metal ion such as lithium ion and sodium ion contained in the composition of the glass substrate to a monovalent metal ion such as sodium ion and potassium ion having a greater ion radius than the above ions. Further, it is a chemical strengthening method for applying compression stress on the surface of the glass substrate. The chemical strengthening method is performed by immersing a glass substrate for a predetermined time into a chemical strengthening treatment liquid in which a chemical strengthening salt is heated and dissolved. Examples of chemical strengthening salts include potassium nitrate, sodium nitrate, silver nitrate, and a mixture of at least two of the these substances. The temperature of the chemical strengthening treatment liquid is preferably a temperature lower than the distortion point of the material of the glass substrate by about 50 to 150° C., and more preferably, the temperature of the chemical strengthening treatment liquid is about 300 to 450° C. At a temperature lower than the distortion point of the material of the glass substrate by about 150° C., the glass substrate cannot be sufficiently treated in the chemical strengthening process. If the temperature exceeds a temperature lower than the distortion point of the material of the glass substrate by about 50° C., the glass substrate may be distorted when undergoing the chemical strengthening treatment.

The scrubbing step of the embodiment is a step combining a process for removing burrs and a so-called washing process, which is a process for removing foreign materials adhered to the surface of the raw material glass plate, but is not limited in such manner, and the process for removing burrs and the washing process may each be performed in separate steps. In other words, in the scrubbing step, the washing liquid does not have to be used and only the removal of burrs may be performed. A new washing process may be provided in a step before or after the scrubbing step to remove foreign materials from the surface of the raw material glass plate.

The correcting pad is not limited to the scrub pad 22 shown in the embodiment and other pads may be used as long as the raw material glass plate is scrubbed in a direction intersecting the direction in which the texture extends and is made of a material in which the 100% modulus is 3 to 40 MPa. Therefore, as long as the correcting pad meets such requirements, the burrs may be removed, for example, by scrubbing with an abrasive tape serving as the correcting pad using the texture machine or by manually scrubbing with a sponge serving as the correcting pad.

What is claimed is:

1. A process for manufacturing a glass substrate for use in an information recording medium, the method comprising:
   polishing a surface of a disc-shaped glass substrate;
   performing texture processing on the surface, the texture processing including:

forming lines of texture on the surface of the glass substrate extending along a circumferential direction of the glass substrate by performing a mechanical texture formation process in which the surface of the glass substrate is supplied with an abrasive slurry while an abrasive member slidably contacts the surface; and correcting the shape of the texture by removing burrs formed on the texture during the formation of the texture by using a correcting pad made of foam of a synthetic resin having a 100% modulus of 3 to 40 MPa and scrubbing the surface of the glass substrate with the correcting pad in a direction intersecting the direction in which the texture extends.

2. The process for manufacturing a glass substrate as claimed in claim 1, wherein the correcting pad has an Asker C hardness of 40 to 70.

3. The process for manufacturing a glass substrate as claimed in claim 2, wherein the correcting pad has a surface including a plurality of holes, with the holes having a diameter of 48 to 60 μm.

4. The process for manufacturing a glass substrate as claimed in claim 2, wherein the surface of the glass substrate is scrubbed with the correcting pad over a time of 2 to 20 seconds.

5. The process for manufacturing a glass substrate as claimed in claim 2, wherein the correcting pad is made of a foam of urethane resin.

6. The process for manufacturing a glass substrate as claimed in claim 2, wherein a washing process for removing foreign material from the surface of the glass substrate is performed before or after said correcting the shape of the texture.

7. The process for manufacturing a glass substrate as claimed in claim 2, wherein said correcting the shape of the texture uses a scrub pad as the correcting pad and includes scrubbing the surface of the glass substrate with the scrub pad, with burrs and foreign material being removed from the surface of the glass substrate during the scrubbing.

8. The process for manufacturing a glass substrate as claimed in claim 1, wherein the correcting pad has a surface including a plurality of holes, with the holes having a diameter of 48 to 60 μm.

9. The process for manufacturing a glass substrate as claimed in claim 8, wherein the surface of the glass substrate is scrubbed with the correcting pad over a time of 2 to 20 seconds.

10. The process for manufacturing a glass substrate as claimed in claim 8, wherein the correcting pad is made of a foam of urethane resin.

11. The process for manufacturing a glass substrate as claimed in claim 8, wherein a washing process for removing foreign material from the surface of the glass substrate is performed before or after said correcting the shape of the texture.

12. The process for manufacturing a glass substrate as claimed in claim 8, wherein said correcting the shape of the texture uses a scrub pad as the correcting pad and includes scrubbing the surface of the glass substrate with the scrub pad, with burrs and foreign material being removed from the surface of the glass substrate during the scrubbing.

13. The process for manufacturing a glass substrate as claimed in claim 1, wherein the surface of the glass substrate is scrubbed with the correcting pad over a time of 2 to 20 seconds.

14. The process for manufacturing a glass substrate as claimed in claim 13, wherein the correcting pad is made of a foam of urethane resin.

15. The process for manufacturing a glass substrate as claimed in claim 13, wherein a washing process for removing foreign material from the surface of the glass substrate is performed before or after said correcting the shape of the texture.

16. The process for manufacturing a glass substrate as claimed in claim 1, wherein the correcting pad is made of a foam of urethane resin.

17. The process for manufacturing a glass substrate as claimed in claim 1, wherein a washing process for removing foreign material from the surface of the glass substrate is performed before or after said correcting the shape of the texture.

18. The process for manufacturing a glass substrate as claimed in claim 1, wherein said correcting the shape of the texture uses a scrub pad as the correcting pad and includes scrubbing the surface of the glass substrate with the scrub pad, with burrs and foreign material being removed from the surface of the glass substrate during the scrubbing.

19. The process for manufacturing a glass substrate as claimed in claim 1, wherein at least a magnetic layer is formed on the glass substrate to fabricate a magnetic disc.

20. An information recording medium glass substrate produced by the process comprising:

polishing a surface of a disc-shaped glass substrate;

performing texture processing on the surface, the texture processing including:

forming lines of texture on the surface of the glass substrate extending along a circumferential direction of the glass substrate by performing a mechanical texture formation process in which the surface of the glass substrate is supplied with an abrasive slurry while an abrasive member slidably contacts the surface; and correcting the shape of the texture by removing burrs formed on the texture during the formation of the texture by using a correcting pad made of foam of a synthetic resin having a 100% modulus of 3 to 40 MPa and scrubbing the surface of the glass substrate with the correcting pad in a direction intersecting the direction in which the texture extends, wherein when a predetermined region of the surface of the glass substrate is measured with an atomic force microscope, with the area of the predetermined region defined as a reference area, the area of a cut plane of the texture obtained by cutting the texture along a plane parallel to the surface of the glass substrate defined as a measured area, the ratio of the measured area with respect to the reference area is defined as a bearing ratio, BR, a position at which the bearing ratio, BR, is 50% defined as a reference plane, a plane at which the texture is cut at a position where the bearing ratio, BR, is an arbitrary value defined as a measured plane, and height from the reference plane to the measured plane defined as bearing height, BH (X), wherein the presence of a burr is defined as having a bearing height in a range of BH (0.01) to BH (0.4), and the difference between the bearing height BH (0.01) and the bearing height BH (0.4) in a state in which the burr has been removed from the texture is 0.01 to 1.0 nm.

21. The information recording medium glass substrate as claimed in claim 20, wherein when the bearing ratio, BR, is in a range of 0.4 to 15.0%, the bearing height BH (X) changes in a linear manner.

22. The information recording medium glass substrate as claimed in claim 20, wherein the information recording medium glass substrate includes a magnetic layer to function as a magnetic disc.

* * * * *